United States Patent [19]
Tinsley et al.

[11] Patent Number: 5,635,896
[45] Date of Patent: Jun. 3, 1997

[54] LOCALLY POWERED CONTROL SYSTEM HAVING A REMOTE SENSING UNIT WITH A TWO WIRE CONNECTION

[75] Inventors: Timothy M. Tinsley, Coon Rapids; Edward L. Schwarz, Minneapolis, both of Minn.

[73] Assignee: Honeywell Inc., Minneapolis, Minn.

[21] Appl. No.: 174,568

[22] Filed: Dec. 27, 1993

[51] Int. Cl.$^6$ ................................................. H04M 11/04
[52] U.S. Cl. ........................... 340/310.05; 236/46 R
[58] Field of Search ..................... 340/310.01, 310.05, 340/825.06, 870.16, 870.39; 323/282, 284, 293; 307/66; 236/46 R, 47, 94, 74 R, 78 R, 78 A; 165/12, 11.1

[56] References Cited

U.S. PATENT DOCUMENTS

| | | | |
|---|---|---|---|
| 3,659,277 | 4/1972 | Brown . | |
| 4,078,720 | 3/1978 | Numberg | 236/46 R |
| 4,333,605 | 6/1982 | Peters | 236/46 R |
| 4,412,450 | 11/1983 | Franz et al. . | |
| 4,413,250 | 11/1983 | Porter et al. | 340/870.39 |
| 4,420,693 | 12/1983 | Becker et al. | 236/47 |
| 4,433,718 | 2/1984 | Bresin | 236/46 R |
| 4,500,821 | 2/1985 | Bitting et al. . | |
| 4,623,871 | 11/1986 | Akano | 340/310.05 |
| 4,633,217 | 12/1986 | Akano | 340/310.05 |
| 4,741,476 | 5/1988 | Russo et al. | 236/46 R |
| 4,751,961 | 6/1988 | Levine et al. | 165/12 |
| 4,776,514 | 10/1988 | Johnstone et al. | 236/46 R |
| 4,780,872 | 10/1988 | Masuda et al. . | |
| 4,783,659 | 11/1988 | Frick . | |
| 4,841,296 | 6/1989 | Kadoya | 340/870.16 |
| 4,864,513 | 9/1989 | Levine et al. | 364/482 |

FOREIGN PATENT DOCUMENTS

| | | |
|---|---|---|
| 2377611 | 8/1978 | France . |
| 2538936 | 9/1984 | France . |
| 2599877 | 12/1987 | France . |
| 59/230353 | 12/1984 | Japan . |
| 643095 | 5/1984 | Switzerland . |

*Primary Examiner*—Brent A. Swarthout
*Attorney, Agent, or Firm*—Edward L. Schwarz

[57] ABSTRACT

A communication system comprises a remote switching module having two signal terminals connected by just two conductors to the signal terminals of a local decoding module. Power is directly provided only to the local decoding module, which applies DC voltage of a first level across the conductors. The remote switching module has a voltage regulator which provides power of a second voltage level lower than the first level for operating a control unit in the switching module. The control unit controls a variable impedance having higher and lower impedance levels and which is connected across the switching module's signal terminals. The decoding module can detect the different impedance levels by sensing the current flow on the conductors. The switching module communicates with the decoding module by modulating the time intervals between changes in impedance levels. The system has particular utility for retrofitting cooling to a heating systems where preexisting thermostat wiring has only two conductors, say when an air conditioning function is added to a previously heat only system. The system is also useful when installing electronic thermostats on heating and cooling systems originally controlled by a mechanical thermostat.

10 Claims, 1 Drawing Sheet

LOCALLY POWERED CONTROL SYSTEM HAVING A REMOTE SENSING UNIT WITH A TWO WIRE CONNECTION

BACKGROUND OF THE INVENTION

It is becoming ever more usual to use electronic controls in place of electromechanical controls which have been previously used to provide similar functions. Perhaps this change is most common in space heating and air conditioning control, where the standard thermostat using a bimetal temperature sensor to operate a mercury switch is more and more often replaced by an electronic thermostat. There are a number of reasons for replacing the electromechanical controls with electronic circuitry. The electronics may be more reliable, and certainly will provide more functions than an electromechanical control. The electronic control is usually much more accurate than the electromechanical control.

The invention addresses a particular problem that arises most often when replacing an electromechanical thermostat with an electronic unit in an existing structure, but may arise in other contexts as well. This problem is that there are frequently only two wires present in the existing structure for connecting the thermostat or other control to the controlled device and thus no convenient way to provide power for the electronic control. Providing power to operate the electronic control circuits at the remote location thus becomes a non-trivial problem.

In these situations, a variety of systems are now in use. It is possible to run extra wires from the controlled system. If standard electrical power is close by, the power may be derived from it. Some thermostats use so-called power stealing systems whose rechargeable batteries are charged when the internal thermostat switch is open. Other thermostats use low power circuitry operated by disposable batteries which must be periodically replaced.

All of these systems have some disadvantages. The power stealing units suffer failures of the rechargeable batteries and require a charging circuit. The need to replace disposable batteries is a nuisance. Running extra wires for thermostats is usually easy and cheap in new construction, but expensive and time-consuming in existing structures. And if the thermostat or other control device is located at an extremely remote location, then running more than two wires may still be disadvantageous. For all these reasons, it has been somewhat of a problem to provide electronic control and sensor circuitry at these remote locations, and in particular, in the case of sophisticated thermostat control in older structures. Ironically enough, it is these older buildings which are the ones which might most benefit from the energy conserving ability provided by the sophisticated temperature control provided by state of the art electronic thermostats.

BRIEF DESCRIPTION OF THE INVENTION

We propose a different approach which places the operational control function in a local module and sensor and human interface elements in a remote module. The local and remote modules are designed to be connected by a single pair of wires only, with power supplied to the remote module by the local module on these two wires. The remote module's circuitry is designed to alter its own impedance. The local module is designed to detect these impedance changes. Times between changes in the impedance of the remote module encode the information provided to the remote module by the sensor and human interface elements. The switch which actually controls power to the controlled apparatus (e.g., the furnace or air conditioner in the case of a thermostat control) is a part of the local module. The local module is located in the vicinity of the controlled apparatus or, for that matter, at any location at which power is available, and then is connected to control the apparatus. The remote module may be located at any convenient site, and in the case of thermostatic control, within the controlled space.

In one embodiment of this invention, the local and remote modules form a communication system to be operated using electrical power of a first voltage level supplied at a local site. The local site has a local decoding module having a pair of power terminals to which the electrical power is to be applied, and first and second local signal terminals. A remotely located switching module has first and second remote signal terminals for connection to the local signal terminals by a pair of electrical conductors. The remote module receives a sensor signal indicating the value of an external condition, which might be in the case of a thermostat, such things as keyboard data supplied by the occupant, as well as the signal provided by a temperature sensor.

In one embodiment of this invention, the decoding module comprises a power supply means receiving the power from the power terminals, and applying a DC signal voltage level across the local signal terminals and causing current to flow therethrough. There is also in the decoding module, a current detector sensing the current flowing through the local signal terminals and providing a pulse width signal dependent on the time between current level changes.

The remote switching module comprises a diode having a first terminal connected to the first remote signal terminal, and a second terminal; a capacitor connected between the second diode terminal and the second remote signal terminal; a control circuit receiving operating power from the remote signal terminals, and receiving the sensor signal, and providing a switching signal having first and second levels whose durations are dependent on the sensor signal; and a variable impedance means. The variable impedance means has a pair of switch terminals connected across the remote signal terminals and a control terminal receiving the switching signal, and provides first and second predetermined impedance levels between the switch terminals responsive respectively to the first and second levels of the switching signal.

By altering the impedance of the variable impedance means, the amount of current drawn by the remote switching module is changed. This current flows through the fixed impedance means, changing the voltage drop across it. The pulse width detector senses these changes in voltage and provides a pulse width signal which is dependent on the time between successive changes in the fixed impedance means voltage.

Typically, different meanings will be assigned to different times between voltage changes. The remote switching module can for example, vary this time to indicate the current temperature sensed by a temperature sensor. Where this system is employed as a part of a thermostat, there will usually be a keypad at the remote switching module, and other changes in the voltage across the fixed impedance means can be used to indicate a temperature setting entered by the user or selected by a microcontroller within the remote switching module according to previous data entry by an occupant of the space where the remote switching module is mounted.

DESCRIPTION OF THE PREFERRED EMBODIMENT

Figure 1:
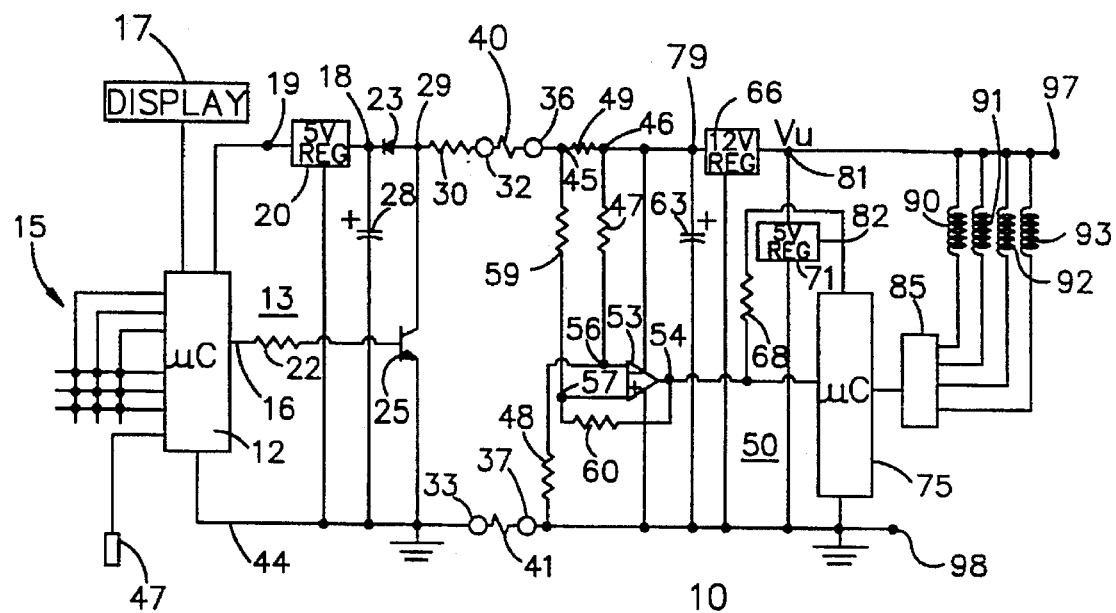
FIG. 1 is a schematic of a circuit embodying the invention.

Turning first to FIG. 1, a communication system 10 is shown as comprising a remote switching module 13 and a local decoding module 50. Power for system 10 is provided at power terminals 97 and 98 of local module 50, and is shown as an unregulated DC voltage $V_u$. Power terminal 98 may be considered to be at a common voltage level, negative with respect to $V_u$ in this embodiment. Local decoding module 50 also has local signal terminals 36 and 37. Remote module 13 has a pair of remote signal terminals 32 and 33 which are connected to local signal terminals 36 and 37 respectively by conductors 40 and 41.

It is convenient to first explain the structure and operation of local module 50. Throughout this explanation of local module 50, one should assume that module 13 has the capability of altering the impedance which it presents at local signal terminals 36 and 37. The unregulated DC voltage applied to terminals 97 and 98 is received at a terminal 81 by a power supply means comprising a voltage regulator 66, and is converted thereby to regulated 12 v. DC available between power terminal 79 signal terminal 37 for powering remote module 13 as well as a voltage comparator 53 located within local module 50. The voltage provided by regulator 66 must be high enough to provide adequate power to the remote module 13, and for 5 v. circuitry in remote module 13, 12 v. is fully adequate. A filter capacitor 63 is connected between power terminal 79 and common terminal 98 to further smooth the ripples that may be present in the output of regulator 66. A resistor 49 serves as a fixed impedance to supply current to signal terminal 36 from regulator 66. Resistor 49 has a first terminal 45 connected to signal terminal 36 and a second terminal 46 connected to power supply terminal 79. The value of resistor 49 should be relatively low, say in the range of 500 to 1000Ω so as to provide adequate but not excessive current flow on path 40 to remote module 13. There is also a second power supply means comprising a 5 v. voltage regulator 71 which performs a function similar to that of regulator 66 except that the unregulated voltage applied at terminal 81 is converted to regulated 5 v. DC at terminal 82. The 5 v. regulator 71 is present to power a microcontroller 75. The voltage provided by regulator 71 should match the voltage required by microcontroller 75.

One can see that each time remote module 13 alters the impedance presented across terminals 36 and 37, the level of current flow through resistor 49 will change. A change in current flow across resistor 49 will of course change the voltage across resistor 49 as well. The voltage comparator 53 is provided to detect these voltage changes. Comparator 53 has a – input terminal 56 connected to a first terminal of a signal resistor 59, whose second terminal is connected to terminal 45 of resistor 49. A + input terminal 57 of comparator 53 is connected to receive a fixed reference voltage provided by a voltage divider comprising series resistors 47 and 48 connected between terminal 46 of resistor 49 and signal terminal 37. A voltage feedback resistor 60 is connected between the output terminal 54 of comparator 53 and its + input terminal 57. A pull-up resistor 68 connects the 5 v. regulator 71 output at terminal 82 to the output terminal 54 of comparator 53. Resistors 60 and 68 provide hysteresis in the detection of voltage changes at input terminals 57 and 57. Comparator 53 may be of the type available from National Semiconductor Corp. which has the designation LM 393.

Resistor 59 may have an intermediate value on the order of 10KΩ and provides the signal voltage at terminal 45 to the + input terminal 57 of comparator 53. The voltage divider formed by resistors 47 and 48 provides a fixed reference voltage whose value may be slightly greater than half of the voltage at the output of regulator 66, or in the range of 6 to 7 v. for the 12 v. output or regulator 66. I prefer that resistors 47 and 48 each have respective values on the order of 100KΩ. At any rate, the voltage drop across resistor 47 should be somewhat greater than the voltage drop across resistor 49 present when remote module 13 has its high impedance, and somewhat less than the voltage drop across resistor 49 which occurs when remote module 13 has its low impedance. As an example, if remote module 13 draws 15 ma. when in its low impedance mode, and 5 ma. when in its high impedance mode, then the change in voltage drop across a resistor 49 having a value of 510Ω is from 2.55 v. to 7.65 v., and the drop across resistor 47 might be chosen to be 5.5 v., which places input terminal 56 at 6.5 v. above the common voltage level of terminal 98. Note that current flow through resistor 59 is negligible if resistor 60 is very large because the input impedance of comparator 53 is very large.

Resistor 60 feeds back the output voltage of comparator 53 so as to provide hysteresis in the response of comparator 53 to changes in the signal voltage at minus terminal 57, resulting in sharp changes in the logic voltage at output terminal 54 of comparator 53 with little switching noise. Resistor 60 should be many times the value of resistor 59, say on the order of a megohm or more. Use of a feedback resistor 60 to provide hysteresis in the output signal of a comparator is a conventional expedient. Resistor 68 further controls the hystersis in signal detection at terminal 57 by pulling up the output voltage from comparator 53 to assure a high logic level at the comparator's output terminal 54, and its use is also conventional. Resistor 68 may have a value comparable to the value of resistor 59.

Microcontroller 75 is used to perform decoding and control functions at the local site, based on information provided by the remote module 13 in a manner to be described. Microcontroller 75 may be of the type available from Motorola Inc., Phoenix, Ariz. having the designation MC68HC05. The MC68HC05 microcontroller requires the 5 v. power provided by regulator 82. In the example shown, microcontroller 75 controls a relay driver unit 85 which in turn actuates relay windings 90–93 which control flow of power to the various elements of an operating system such as a heating or cooling system (not shown). Microcontroller 75 also performs the function of decoding the signals which the remote module 13 provides. The algorithms performed by this system for controlling relay driver 85 may be executed exclusively in microcontroller 75, exclusively in a microcontroller 12 in remote module 13, or by both of the modules 13 and 50. There is an advantage however, to placing safety-related functions of a system controlled by relay windings 90–93 in the local module 50 so as to avoid problems if the data connection between modules should become defective. For example, if relay winding 90 controls a fuel valve, the algorithms involved with opening and closing this valve are preferably executed by microcontroller 75.

Turning next to the details of the structure of remote switching module 13, the impedance changes across its signal terminals 32 and 33 arise from changes in the impedance of a variable impedance means comprising a resistor 30 and a transistor 25. Resistor 30 has a first terminal connected to remote signal terminal 32 and a second terminal 29 connected to the collector of transistor 25. The emitter of transistor 25 is connected to the common voltage path 44. Transistor 25 may be of the field effect or bipolar type.

A diode 23 has its anode is connected to the emitter of transistor 25 and its cathode to the input terminal 18 of a second voltage regulator 20. Regulator 20 thus receives power from regulator 66 through resistor 49, conductor 40, resistor 30, and diode 23. A power capacitor 28 is connected between regulator input terminal 18 and the common voltage path 44. The output terminal 19 of regulator 20 provides 5 v. regulated DC for operating a microcontroller 12. Microcontroller 12 may also be of the type available from Motorola Inc. having the designation MC68HC05.

Microcontroller 12 performs the various functions needed for gathering data at the remote site where module 13 is located and for causing this data to be transmitted to local module 50. A keypad 15 is symbolically shown as providing one set of inputs to microcontroller 12 through one of its input ports. A temperature sensor 47 is also shown as providing a signal input to microcontroller 12 through another of its input ports. In certain applications it is convenient to provide a display 17 receiving display information through an output port for the user so (s)he can determine the current temperature and detect any errors when entering data on keypad 15. Display 17 may also show status information such as a previous power outage, overtemperature conditions, and the like.

Microcontroller 12 communicates with local module 50 by changing the impedance of transistor 25, typically operating it between saturation and cutoff, although any detectable change in impedance may be suitable. Changing the impedance of transistor 25 changes the impedance of module 13 and hence alters the current flow through resistor 49 in module 50. Where transistor 25 saturates in the low impedance state for module 13, to allow current flow of 15 ma. through resistor 49 when transistor 25 is saturated, resistor 30 should have a value of 290Ω. An output port 16 of microcontroller 12 is connected by a current limiting resistor 22 to the base of transistor 25. While a logic signal of a first level is applied to the base of transistor 25 by port 16 of microcontroller 12, the collector to emitter impedance of transistor 25 is relatively high. While a logic signal of a second level is applied by microcontroller 12 to the base of transistor 25 through resistor 22, the transistor 25 impedance is relatively low, and assumed to be negligible in this embodiment. The different impedances of transistor 25 result in different current flow from power supply means 66 through resistor 49. When the impedance of transistor 25 is high, capacitor 25 charges to the voltage at terminal 29 less one diode voltage drop of around 0.7 v. In the embodiment of FIG. 1, when the voltage at the second terminal 29 of resistor 30 falls to below that required to provide the 5 v. output of regulator 20 when the collector-emitter impedance across transistor 25 is low, charge stored on capacitor 28 can supply regulator 20 with current for a period of time. Diode 23 cuts off in this situation, so that all of the charge on capacitor 28 is supplied to regulator 20. This provides microcontroller 12 with power while transistor 25 conducts. It is necessary to assure that microcontroller 12 does not ever hold the impedance of transistor 25 at a level so low and for a time so long that charge is depleted in capacitor 28 to an extent that microcontroller 12 cannot function properly.

Discussing next the cooperation between module 13 and a module 50 having the previously stated component parameters, when transistor 25 has its high impedance, current flow through resistor 49 and connector 40 was assumed to be 5 ma. In this state, the voltage at both terminals 45 and 57 will be about 9.45 v. because only a negligible current flows in resistor 59. Because the voltage at input terminal 56 of comparator 53 is about 6.5 v., comparator 53 detects the relatively low voltage drop across resistor 49, and provides a high logic level signal at output terminal 54. When transistor 25 conducts, approximately 15 ma. flows through resistor 49, and the voltage at terminal 36 has a lower value of perhaps 4.35 v. This level is less than the 6.5 v. at the comparator's input terminal 56, and the voltage at the output terminal 54 falls to its low level of 0.5 v. Microcontroller 75 measures the times between level changes in the logic signal at terminal 54, and can decode the information encoded in it. It is possible to have as many as several thousand changes in the impedance of remote module 13 each second and still be easily detectable by local module 50 even in relatively noisy conditions. Such an information capacity is more than enough for most types of control and communication required for the application intended.

The duration of relative high and low impedance values can be easily controlled by microcontroller 12 and easily detected by the microcontroller 50.

Figure 2:
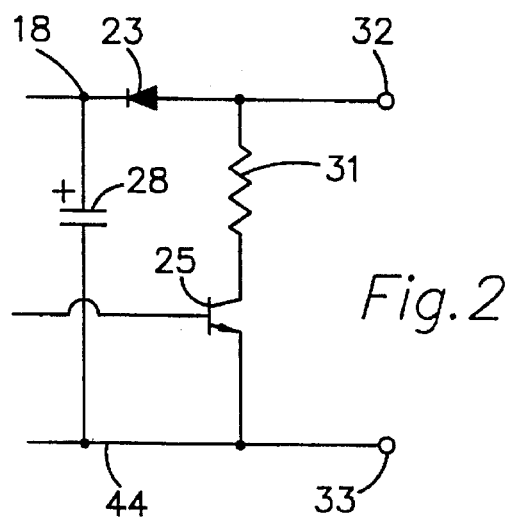
FIGS. 2 and 3 show alternate arrangements of a part of the circuit of FIG. 1.
Figure 3:
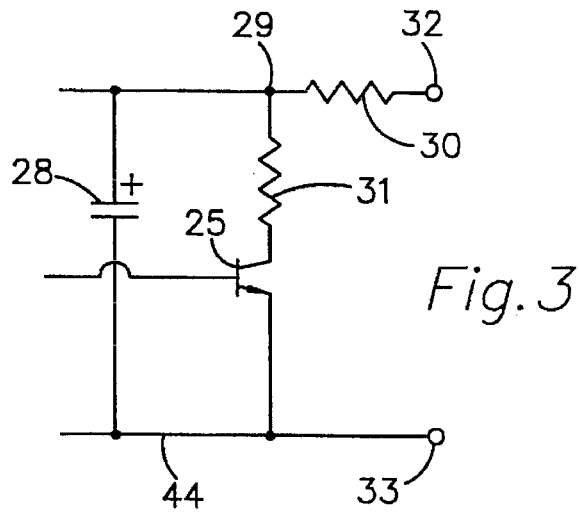

FIGS. 2 and 3 show alternative designs for the impedance switching in the remote module 13. These alternatives reflect the fact that it is only necessary for the variable impedance means to provide a voltage at terminal 18 adequate to permit the operation of microcontroller 12 at all times, and to limit current flow through the various components to a level below their rated values. In FIG. 2, resistor 31 and transistor 25 comprise the variable impedance means. Resistor 31 provides a fixed impedance to limit current flowing through transistor 25, and resistor 30 has been omitted. It is also possible to omit diode 23 if resistor 31 is sufficiently large to assure that the voltage drop across terminals 32 and 33 is always greater than that required by regulator 20 to provide the voltage necessary for operating microcontroller 12. Theoretically, capacitor 28 is also unnecessary so long as the voltage across terminals 32 and 33 is greater than required for operating microcontroller 12. However, capacitor 28 provides a measure of protection against voltage surges on conductors 40 and 41, protecting transistor 25 against damage caused thereby.

In the circuit of FIG. 3, no input diode is shown, and resistors 30 and 31 and transistor 25 comprise the variable impedance means. In this arrangement, the voltage drop across resistor 31 and transistor 25 when in its low impedance state must permit a voltage at terminal 29 sufficient to operate microcontroller 12.

The length of conductors 40 and 41 are limited by a number of considerations. The resistance in them should be small enough to assure that voltage swings at input terminal 57 are across the fixed voltage at input terminal 56. It is possible to compensate for different conductor 40 and 41 resistances by changing the resistance of resistor 30 or 31. Those having skill in circuit design and communication theory will be easily able to select values for these components as well as the others shown in FIGS. 1–3 to implement this communication system.

What we claim is:

1. A communication system to be operated using electrical power of a first voltage level, and having i) a local decoding module having a pair of power terminals to which the electrical power is to be applied, first and second local signal terminals, and a signal output terminal; and ii) a remotely located switching module having first and second remote signal terminals for connection to the local signal terminals by a pair of electrical conductors, and receiving a sensor signal indicating the value of an external condition, wherein the decoding module comprises:

a) a power supply means receiving the power from the power terminals, for continuously applying a DC signal voltage level across the first and second local signal terminals and for causing a current to flow therethrough;

b) a detector means for sensing the current flowing through the first and second local signal terminals, for providing an output signal dependent on the current level changes;

and wherein the remote switching module comprises:

c) a control circuit means receiving operating power at a power terminal from the power supply means through the remote signal terminals, for receiving the sensor signal, and providing a switching signal having first and second levels whose durations are dependent on the sensor signal; and d) a variable impedance means having a pair of switch terminals connected across the remote signal terminals, and a control terminal receiving the switching signal, for providing first and second predetermined impedance levels between the remote signal terminals responsive respectively to the first and second levels of the switching signal, wherein the variable impedance means further comprises a diode having a first terminal connected to the first remote signal terminal and a second terminal connected to the control circuit; and a capacitor connected between the second diode terminal and the second remote signal terminal.

2. The communication system of claim 1, wherein the variable impedance means further comprises a resistor connecting the first remote signal terminal to the first terminal of the diode.

3. The communication system of claim 2, wherein the variable impedance means further comprises a transistor having its power terminals connected between the first terminal of the diode and the second remote signal terminal, and having its control terminal receiving the switching signal.

4. The communication system of claim 1 wherein the orientation of the diode causes it to be forward biased by DC signal voltage applied by the power supply means to the remote signal terminals through the pair of electrical conductors when the variable impedance means has its first impedance.

5. The communication system of claim 1, wherein the variable impedance means comprises a first resistor connecting the first remote signal terminal to the control circuit, a second resistor, and a transistor having first and second power terminals between which high and low impedance exists responsive respectively to the first and second levels of the switching signal, said first and second transistor power terminals in series with the second resistor to form a series circuit, with said series circuit connected between the control circuit's power terminal and the second remote terminal.

6. The communication system of claim 5, including a capacitor in parallel connection with the series circuit.

7. The communication system of claim 1, wherein the detector means includes a current detection resistor conducting current from the power supply means; a comparator receiving power from the decoding module's power terminals, and having input terminals connected across the current detection resistor, and an output terminal providing a comparator signal dependent on the voltage across the first signal terminals; and a logic circuit receiving the comparator signal and providing an output signal having levels dependent on the comparator signal.

8. The communication system of claim 7, wherein the logic circuit further comprises a microcontroller.

9. The apparatus of claim 1, wherein the detector means and the control circuit means respectively comprise first and second microcontrollers.

10. The apparatus of claim 9, wherein the second microcontroller receives the sensor signal, and responsive thereto, provides the switching signal, the durations of whose first and second levels are dependent on the value indicated by the sensor signal.

* * * * *